(12) United States Patent
Bessho et al.

(10) Patent No.: US 8,596,984 B2
(45) Date of Patent: Dec. 3, 2013

(54) RESIN FAN

(75) Inventors: Masahiro Bessho, Aichi (JP);
Takamitsu Himeno, Aichi (JP); Atsushi Suzuki, Aichi (JP); Takayuki Kobayashi, Aichi (JP); Kimihiko Okamoto, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 779 days.

(21) Appl. No.: 12/746,987

(22) PCT Filed: Oct. 31, 2008

(86) PCT No.: PCT/JP2008/069855
§ 371 (c)(1),
(2), (4) Date: Jun. 9, 2010

(87) PCT Pub. No.: WO2009/107278
PCT Pub. Date: Sep. 3, 2009

(65) Prior Publication Data
US 2010/0272573 A1 Oct. 28, 2010

(30) Foreign Application Priority Data
Feb. 28, 2008 (JP) .................................. 2008-048487

(51) Int. Cl.
*F04D 29/32* (2006.01)
(52) U.S. Cl.
USPC ....................................... 416/230; 416/241 A
(58) Field of Classification Search
USPC .......... 416/179, 180–182, 185, 223 R, 229 R, 416/230, 231 A, 234, 241 A, 241 B, 241 R, 416/242, 244 R, 169 A; 415/169.1, 169.4, 415/168.1; D23/413
See application file for complete search history.

(56) References Cited

U.S. PATENT DOCUMENTS

| | | | |
|---|---|---|---|
| D570,470 S * | 6/2008 | Suzuki et al. | D23/413 |
| 2005/0238486 A1 | 10/2005 | Stagg et al. | |
| 2007/0104581 A1 | 5/2007 | Stagg et al. | |

FOREIGN PATENT DOCUMENTS

| | | |
|---|---|---|
| JP | 2003-94494 A | 4/2003 |
| JP | 2005-54722 A | 3/2005 |
| JP | 2005-313640 A | 11/2005 |
| JP | 2007-285135 A | 11/2007 |

OTHER PUBLICATIONS

International Search Report of PCT/JP2008/069855, mailing date of Jan. 27, 2009.

* cited by examiner

*Primary Examiner* — Ninh H Nguyen
(74) *Attorney, Agent, or Firm* — Westerman, Hattori, Daniels & Adrian, LLP

(57) ABSTRACT

There is provided a resin fan capable of enhancing the mechanical strength in a weld part in view of the direction of reinforcing fiber. On the outer peripheral surface 16*a* of a cylindrical rib 16, convex parts 30 are formed in the middle portions between the portions in which radial ribs 18 adjoining each other are connected to the cylindrical rib 16. The cylindrical rib 16 is formed so that the thickness T in the radial direction thereof is decreased gradually from the base part 16*c* thereof toward the tip end part 16*d*. Further, the height H1 of the cylindrical rib 16 is set so as to be larger than the height H2 of the radial rib 18. Thereby, at the time of molding, the resin flows in the portions of the cylindrical rib 16 and the convex parts 30 are complicated, and thereby the orientation of glass fiber mixed in the resin is complicated.

6 Claims, 7 Drawing Sheets

RESIN FAN

TECHNICAL FIELD

The present invention relates to a resin fan equipped to cool a radiator or an air conditioning condenser.

BACKGROUND ART

A fan equipped to cool a vehicular radiator or an air conditioning condenser is generally formed by resin molding.

For the fan of this type, the shape and dimensions thereof have been designed focusing on enhancing the performance. However, because of the manufacturing method of resin molding, if the wall thicknesses of fan parts increase, the cooling after resin molding takes much time, which leads to a decrease in production efficiency. Therefore, it is preferable that the wall thicknesses of fan parts be as small as possible. The same holds true for reduction in weight. On the other hand, the decrease in wall thickness leads to a decrease in fan strength. As far as the product quality goes, a strength sufficient to prevent breakage or the like from occurring after the start of service is required. Thus, it is a matter of course that it is unpreferable to decrease the wall thickness indiscriminately.

Conventionally, in order to form such a fan by resin molding, resin is injected from gates formed at a plurality of locations of a mold, and the mold is released after the completion of the resin injection. At this time, resins injected from different gates join together in the mold. This joint of resins is called a weld. Comparing the weld part with other parts, the mechanical strength of the weld part is lower than those of other parts. If a weld is present in a stress concentrated portion, damage such as a crack occurs easily in the weld part.

To overcome this problem, there has been proposed a technique in which the wall thickness of the weld part is made larger than those of other parts to improve the mechanical strength of the weld part and to make damage less liable to occur (for example, refer to Patent Document 1). Also, there has been proposed a technique in which the weld is formed in a portion other than stress concentrated portions (for example, refer to Patent Document 2).

Patent Document 1: Japanese Unexamined Patent Application Publication No. 2003-94494
Patent Document 2: Japanese Unexamined Patent Application Publication No. 2007-285135

DISCLOSURE OF THE INVENTION

Problems to be Solved by the Invention

In the resin for forming the fan, glass fiber or the like is mixed as reinforcing fiber to improve the strength. In the resin in which the reinforcing fiber is mixed, the mechanical strength differs depending on the direction of the reinforcing fiber. To secure the strength in all directions on an average, it is preferable that the direction of reinforcing fiber be as random as possible.

When resins P1 and P2 injected from different gates flow in the directions A and B, respectively, and join together in the weld part as shown in FIG. 6A, the flows of one resin P1 and the other resin P2 become symmetrical in the right-and-left direction in the tip end portions of the flows of the joining resins P1 and P2 as shown in FIG. 6B. As a result, the direction of reinforcing fiber F easily becomes parallel with the joint of resin, which leads to a decrease in the strength in a specific direction (X direction in FIG. 6B) of this part as compared with the strengths of other parts.

This problem cannot be solved satisfactorily merely by the increase in wall thickness of weld part as in the technique described in Patent Document 1.

The present invention has been accomplished to solve the aforementioned technical problem, and accordingly an object thereof is to provide a resin fan capable of enhancing the mechanical strength in a weld part in view of the direction of reinforcing fiber.

Means for Solving the Problems

To achieve the above object, the present invention provides a resin fan made of a resin containing glass fiber and comprising a plurality of blades and a boss part to which the blades are attached integrally and which is connected to a motor, wherein the boss part comprises a plurality of radial ribs extending radially; and a tubular-shaped tubular rib to which one end of each of the radial ribs is connected integrally. In this resin fan, the tubular rib comprises a junction portion where the resin having passed through one radial rib forming portion and the resin having passed through the other radial rib forming portion adjoining the one radial rib forming portion join together when the resin having been injected into a mold for forming the fan passes through the one radial rib forming portion and the other radial rib forming portion and flows into a tubular rib forming portion in the fan molding process. At the junction portion, there located a resin agitating part for complicating the orientations of the glass fiber contained in the resin having passed through the one radial rib forming portion and the glass fiber contained in the resin having passed through the other radial rib forming portion.

In the resin agitating part, the resin flow at the time when the resin having passed through the one radial rib forming portion and the resin having passed through the other radial rib forming portion join together is complicated three-dimensionally, whereby the orientation of glass fiber contained in both of the resins is complicated.

As the resin agitating part, a convex part projecting to the outer periphery side and/or the inner periphery side of the tubular rib can be formed. When the resins pass through the radial rib forming portions adjoining each other, flow into the tubular rib forming portion and thereafter flow from the tubular rib into the convex part, the cross-sectional areas of the resin having passed through the one radial rib forming portion and the resin having passed through the other radial rib forming portion are enlarged suddenly, and thus the resin flow is complicated.

The convex part can be formed so that the projecting dimension thereof is decreased gradually from one surface side of the fan toward the other surface side thereof. This also enables to produce a direction component such as to be directed from the other surface side of the fan toward the one surface side thereof in the resin flow, and thus the resin flow is complicated further.

The tubular rib is preferably formed so that the thickness in the radial direction thereof is decreased gradually with a gradient of 3 degrees or larger from the one surface side of the fan toward the other surface side thereof. This enables to produce a direction component such that the resin flows from the one surface side toward the other surface side when the resin flows in the tubular rib, and thereby as well, the resin flow is complicated.

The tubular rib preferably projects to the other surface side of the fan beyond the radial ribs. This leads to produce a direction component in the tip end part of the tubular rib from the radial rib toward the projected portion of the tubular rib, that is, toward the other surface side of the fan, when the resin flows from the radial rib into the tubular rib. Thereby as well, the resin flow is complicated.

Advantages of the Invention

According to the present invention, in the resin agitating part comprising the convex part formed on the tubular rib, the gradient of thickness of the tubular rib, the protrusion of the tubular rib with respect to the radial ribs, and the like, the resin flow at the time when the resin having passed through the one radial rib forming portion and the resin having passed through the other radial rib forming portion join together can be complicated three-dimensionally. Thereby, the orientation of glass fiber contained in both of the resins can be complicated. As a result, the mechanical strength in the junction portion where the resin having passed through the one radial rib forming portion and the resin having passed through the other radial rib forming portion join together can be enhanced.

DESCRIPTION OF SYMBOLS

10 ... fan, 11 ... boss part, 12 ... blade, 13 ... disc part, 14 ... supporting rib, 15 ... shaft hole, 16 ... cylindrical rib (tubular rib), 16a ... outer peripheral surface, 16b ... inner peripheral surface, 16c ... base part, 16d ... tip end part, 18 ... radial rib, 18a ... tip end part, 19 ... reinforcing rib, 30 ... convex part (resin agitating part), 30a ... base part, 30b ... tip end part

BEST MODE FOR CARRYING OUT THE INVENTION

The present invention will now be described in detail based on an embodiment shown in the accompanying drawings.

Figure 1A:
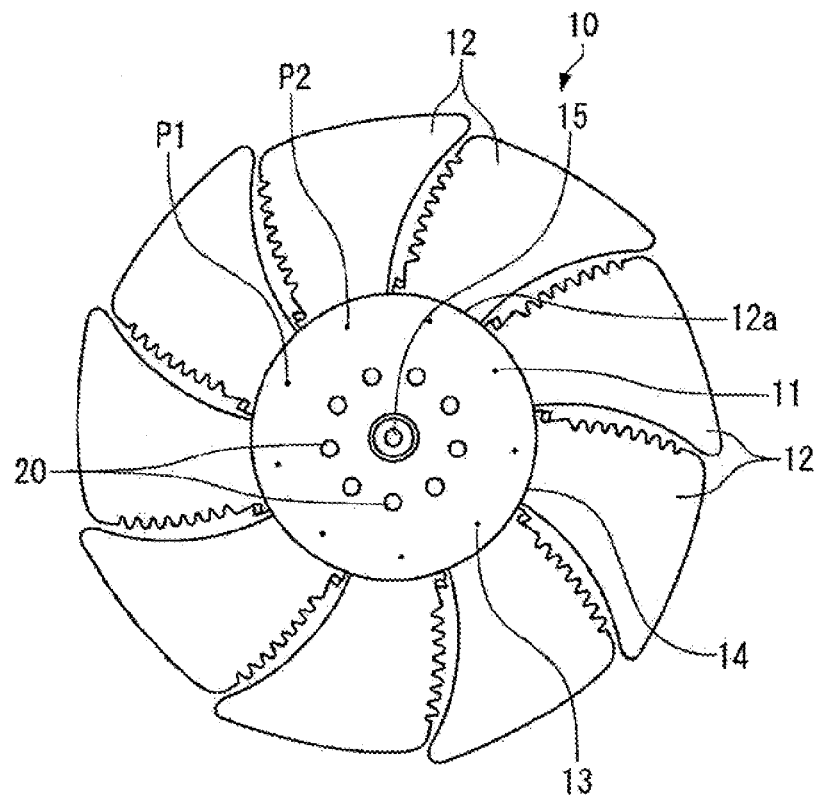
FIGS. 1A and 1B are views showing the schematic shape of a fan in accordance with an embodiment of the present invention, FIG. 1A being a view viewed from one side on which a disc part is formed, and FIG. 1B being a view viewed from the other side on which a cylindrical rib and the like are formed.
Figure 1B:
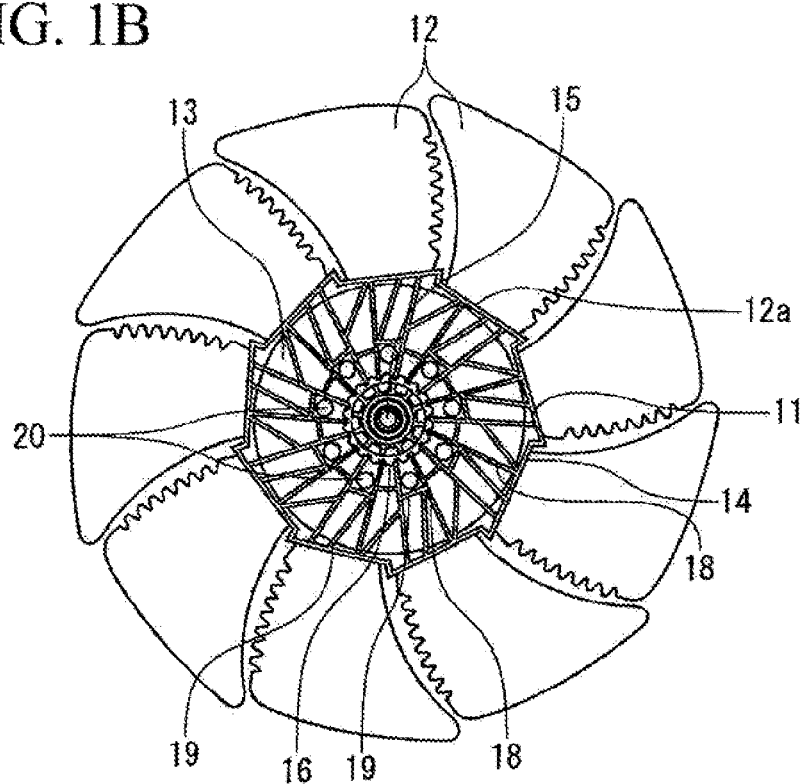
Figure 2A:
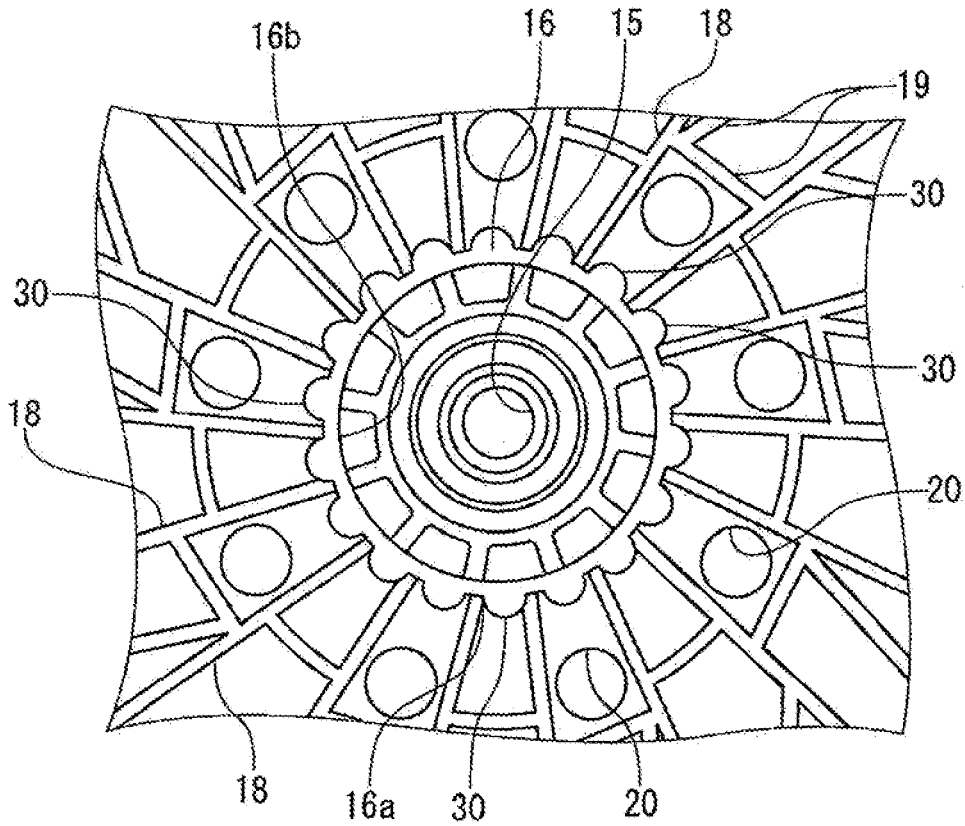
FIGS. 2A and 2B are views showing the essential portion of the fan, FIG. 2A being a plan view, and FIG. 2B being a perspective cross-sectional view.
Figure 2B:
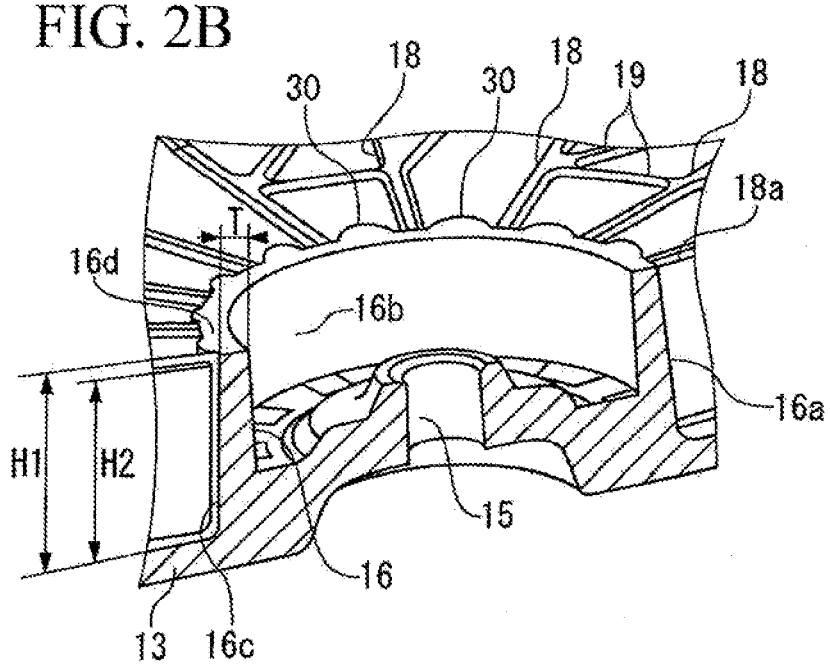

FIGS. 1A and 1B are views showing the schematic shape of a fan 10 in accordance with this embodiment. FIG. 1A is a view viewed from one side on which a disc part 13 is formed, and FIG. 1B is a view viewed from the other side on which a cylindrical rib 16 and the like are formed.

As shown in FIGS. 1A and 1B, the fan 10 comprises a boss part 11 for mounting the fan 10 on the shaft of a motor (not shown) for driving the fan 10, and a plurality of blades 12 provided so as to extend from the boss part 11 to the outer periphery side. The boss part 11 and the blades 12 each are made of a resin in which glass fiber is mixed.

The boss part 11 has a disc part 13 with a circular disc-shape, and a supporting rib 14 that is formed integrally in the outer peripheral portion of the disc part 13 so as to extend toward one surface side of the disc part 13 to support base parts 12a of the blades 12.

In the central portion of the disc part 13, a shaft hole 15 into which the shaft of the motor (not shown) is inserted is formed. In the disc part 13, on the outer periphery side of the shaft hole 15, a cylindrically shaped cylindrical rib (tubular rib) 16 is formed so as to extend toward one surface side of the disc part 13.

Between the supporting rib 14 and the cylindrical rib 16, radial ribs 18 extending almost radially with the shaft hole 15 being the center and reinforcing ribs 19 provided between the radial ribs 18 adjoining each other are formed. Some of the reinforcing ribs 19 are continuous in the circumferential direction with the shaft hole 15 being the center, and some thereof extend slantwise between the radial ribs 18 adjoining each other.

In the disc part 13, a plurality of cooling holes 20 penetrating both surfaces thereof are formed at positions not interfering with the supporting rib 14, the cylindrical rib 16, the radial ribs 18, and the reinforcing ribs 19.

The above-described fan 10 is formed by injecting a resin from a mold gate and by cooling and solidifying the resin. In this embodiment, gate positions P1, P2, ... for forming the fan 10 are located at a plurality of locations of the disc part 13.

In the fan 10, on an outer peripheral surface 16a of the cylindrical rib 16, convex parts (resin agitating parts) 30 are formed in the middle portions between the portions in which the radial ribs 18 adjoining each other are connected to the cylindrical rib 16. On the other hand, an inner peripheral surface 16b of the cylindrical rib 16 is formed in a circular shape as viewed in cross section. At the time of molding of the fan 10, the resins injected from the gate positions P1, P2, ... pass through the radial ribs 18 adjoining each other and the disc part 13 and reach the cylindrical rib 16. The resin having passed through one radial rib 18 and the resin having passed through the other radial rib 18 join together at a weld part. The convex part 30 is formed on the weld part in order to complicating the orientation of glass fiber mixed in the resin when the resins join together.

More specifically, in a portion in which the convex part 30 is formed, when the resin having passed through one radial rib 18 and the resin having passed through the other radial rib 18 join together, the resins flow into the convex part 30 from the cylindrical rib 16 on both sides, whereby the cross-sectional area enlarges suddenly, so that the resin flow is made turbulent, and the resin is agitated. Thereby, the orientation of glass fiber mixed in the resin is complicated when the resins join together in the convex part 30.

The cylindrical rib 16 is formed so that the thickness T in the radial direction thereof is decreased gradually from a base part 16c of the cylindrical rib 16 on the disc part 13 side toward the tip end part 16d. It is preferable that the thickness T of the cylindrical rib 16 be decreased gradually at an angle θ of 3 degrees or larger from the base part 16c toward the tip end part 16d.

At the time of molding of the fan 10, when the resin injected from the gate positions P1, P2, ... and passing through the radial ribs 18 and the disc part 13 flows into the cylindrical rib 16, the resin flows from the base part 16c toward the tip end part 16d. At this time, since the thickness T of the cylindrical rib 16 is decreased gradually from the base part 16c toward the tip end part 16d, the resin flow from the base part 16c toward the tip end part 16d is complicated. Thereby, the orientation of glass fiber mixed in the resin is complicated. By this influence, the resin flow into the convex part 30 from the cylindrical rib 16 on both sides is also complicated further, whereby the orientation of glass fiber in the convex part 30 is further complicated.

The height H1 of the cylindrical rib 16 from the disc part 13 is set so as to be larger than the height H2 of the radial rib 18 connected to the cylindrical rib 16 (H1>H2). For example, the height H1 can be set so as to be about 1.0 mm larger than the height H2.

At the time of molding of the fan 10, when the resin injected from the gate positions P1, P2, . . . and passing through the radial ribs 18 and the disc part 13 flows into the cylindrical rib 16, in the tip end part 16d of the cylindrical rib 16, the resin flows from a tip end part 18a of the radial rib 18 toward the tip end part 16d of the cylindrical rib 16. That, is to say, the flow direction of resin in the tip end part 16d of the cylindrical rib 16 is the axis line direction of the shaft (not shown) inserted into the shaft hole 15. Therefore, the resin flow in the tip end part 16d of the cylindrical rib 16 is further complicated. Thereby, the orientation of glass fiber mixed in the resin is further complicated.

Thus, on the outer peripheral surface 16a of the cylindrical rib 16, the convex parts 30 are formed in the middle portions between the portions in which the radial ribs 18 adjoining each other are connected to the cylindrical rib 16, the cylindrical rib 16 is formed so that the thickness T in the radial direction thereof is decreased gradually from the base part 16c toward the tip end part 16d, and further the height H1 of the cylindrical rib 16 is set so as to be larger than the height H2 of the radial rib 18. Thereby, at the time of molding, the resin flows in the portions of the cylindrical rib 16 and the convex parts 30 are complicated three-dimensionally, and thereby the orientation of glass fiber mixed in the resin is complicated. As a result, especially in the weld part in which the convex part 30 is formed, the mechanical strength in the weld part can be enhanced.

Moreover, an effect of sufficiently improving the strength can be achieved by projecting only the portions of the convex parts 30 without increasing the wall thickness of the whole of the cylindrical rib 16. Therefore, high production efficiency and economic efficiency can be maintained without prolongation of time required for molding and without a remarked increase in weight.

Example 1

Studies were conducted on the effect in the case where the convex parts 30 were formed, the cylindrical rib 16 was formed so that the thickness T thereof was decreased gradually from the base part 16c toward the tip end part 16d, and further the height H1 of the cylindrical rib 16 was set so as to be larger than the height H2 of the radial rib 18 as described above. The study results are shown below.

Working Example

The fan 10 shown in FIG. 1 was made of polypropylene (pp) containing 30% glass fiber. For the fan 10, on the outer peripheral surface 16a of the cylindrical rib 16 having a diameter of 35 mm, the convex parts 30 were formed in the middle portions between the portions in which the radial ribs 18 adjoining each other were connected to the cylindrical rib 16. The curvature radius R of the convex part 30 was set at 1.25 mm, and the curvature radius r of the connecting part of the cylindrical rib 16 and the convex part 30 was set at 1.0 mm. Also, the cylindrical rib 16 was formed at an angle θ of 3 degrees so that the thickness T in the radial direction thereof was decreased gradually from the base part 16c toward the tip end part 16d. The thickness T of the tip end part 16d was set at 2.5 mm. Further, the height H1 of the cylindrical rib 16 was set at 13.5 mm and the height H2 of the radial rib 18 was set at 12.5 mm so that the cylindrical rib 16 is taller than the radial rib 18.

Comparative Example

Figure 3A:
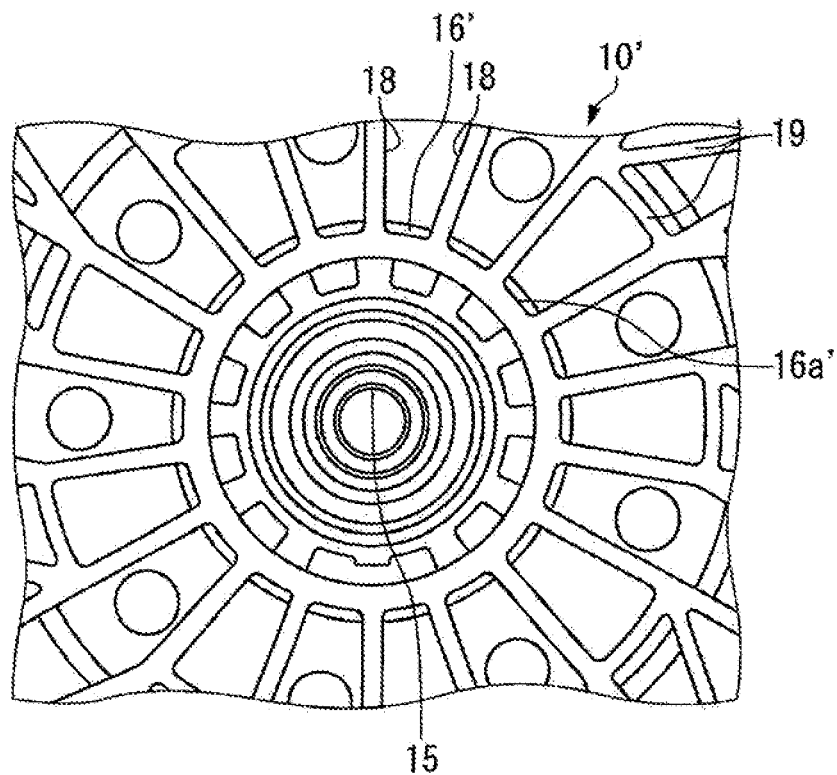
FIGS. 3A and 3B are views showing the essential portion of a conventional fan, being comparative example, FIG. 3A being a plan view, and FIG. 3B being a perspective cross-sectional view.
Figure 3B:
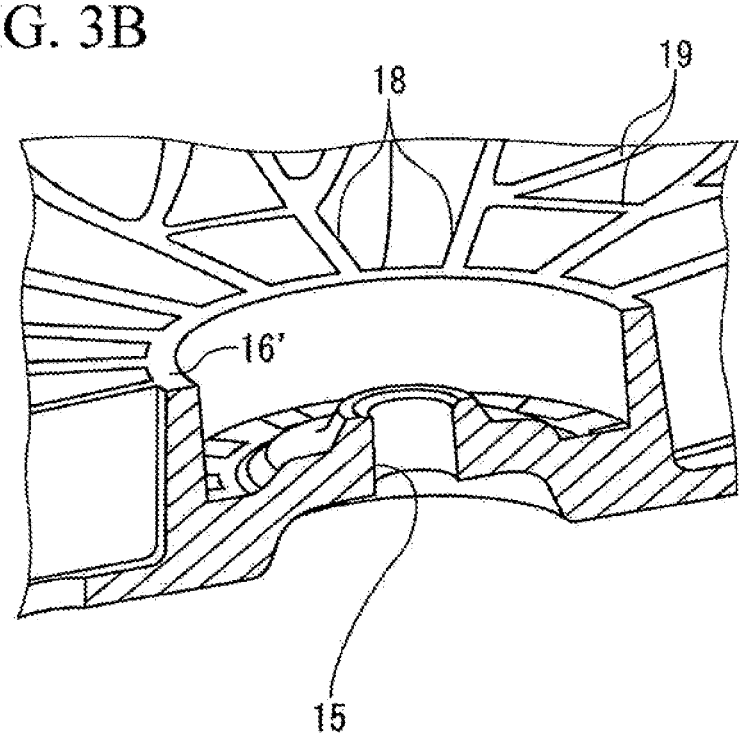

For comparison, as shown in FIG. 3, a fan 10' made of polypropylene (pp) containing 30% glass fiber like the fan 10 of working example was formed so that an outer peripheral surface 16a' of a cylindrical rib 16' having a diameter of 35 mm was of a circular shape without forming the convex parts 30. Also, the usual draft (mold gradient necessary at the time when the fan 10 is released from the mold) of cylindrical rib 16' was set at 1 degree. Further, the cylindrical rib 16' was formed so as to have the same height as that of the radial rib 18.

On working example and comparative example, the resin flow and the orientation of fiber were analytically simulated by a resin flow analysis using PLANETS, an injection molding CAE system of PLAMEDIA Corporation.

Figure 4A:
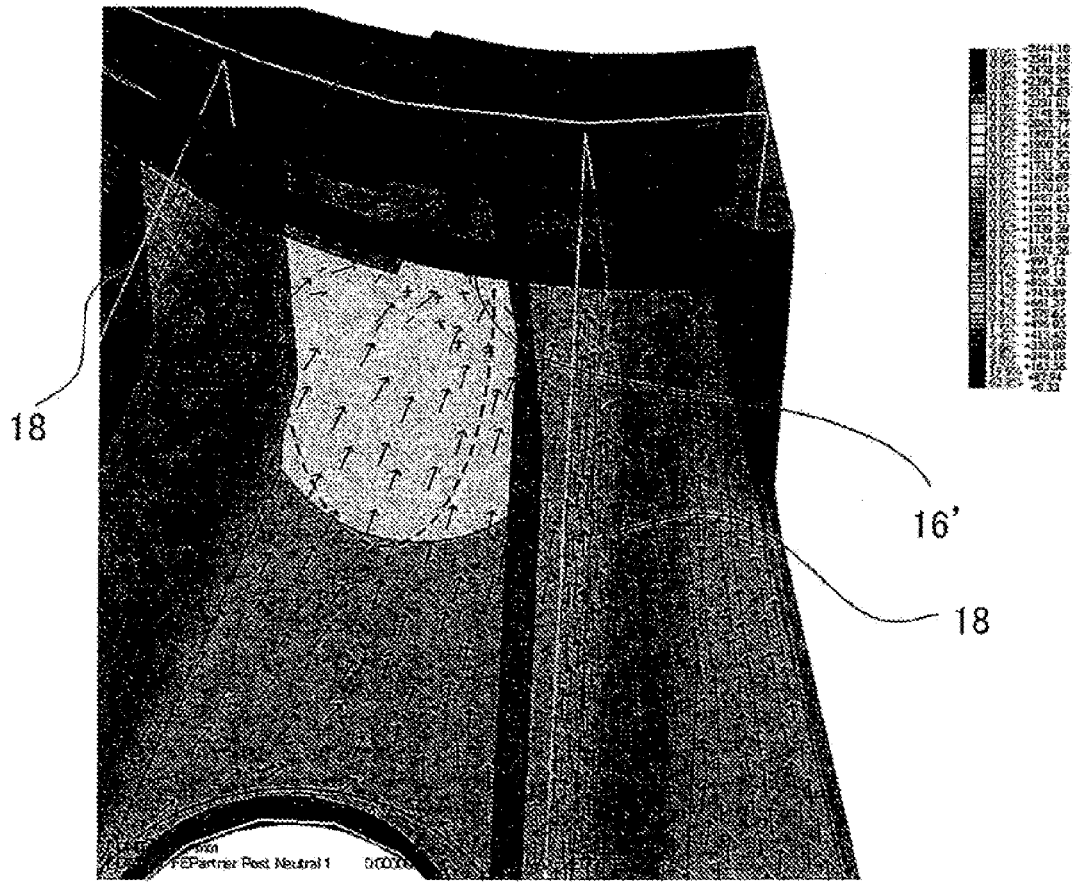
FIGS. 4A and 4B are views showing analysis results of a resin flow at the time when a fan is formed, FIG. 4A showing a comparative example, and FIG. 4B showing a working example.
Figure 4B:
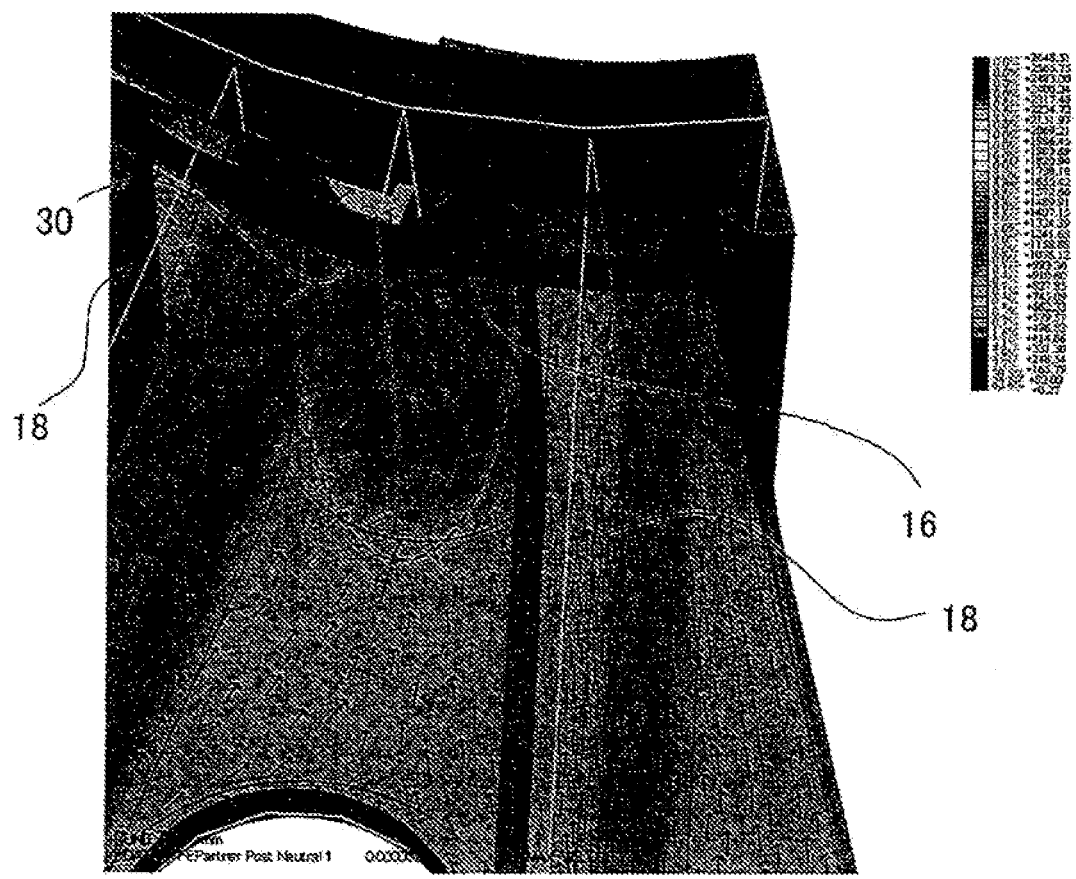

The results are shown in FIGS. 4A and 4B. FIG. 4A shows the analysis results of comparative example, and FIG. 4B shows the analysis result of working example.

As shown in FIG. 4A, in the case of comparative example, the resin flow direction tends to be a specific direction (a portion within a dotted line in FIG. 4A) in the weld part in which the resin having passed through one radial rib 18 and the resin having passed through the other radial rib 18 join together in the cylindrical rib 16'.

In contrast, as shown in FIG. 4B, in the case of working example, it was confirmed that the resin flow direction is complicated (a portion within a dotted line in FIG. 4B) in the convex part 30 formed in the weld part in which the resin having passed through one radial rib 18 and the resin having passed through the other radial rib 18 join together.

Also, on working example and comparative example, a high-temperature endurance test was carried out. In this test, each of the fan was rotated at a rotational speed of 1700 rpm for 200 hours in a high-temperature environment of 110° C.

As a result, in comparative example, whitening and crack formation were noticed on the cylindrical rib 16'. In contrast, in working example, no trouble was noticed.

Figure 5A:
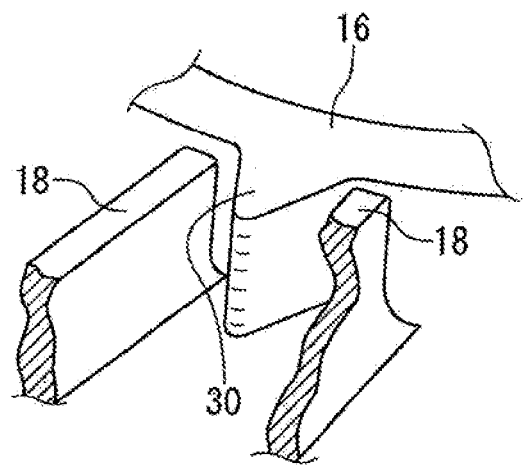
FIGS. 5A to 5C are views showing examples of convex parts having other shapes.
Figure 5B:
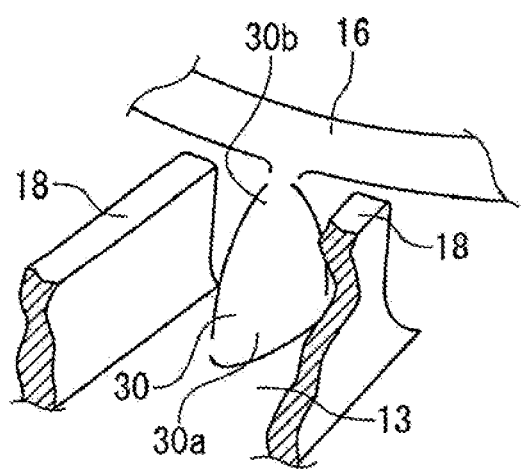
Figure 5C:
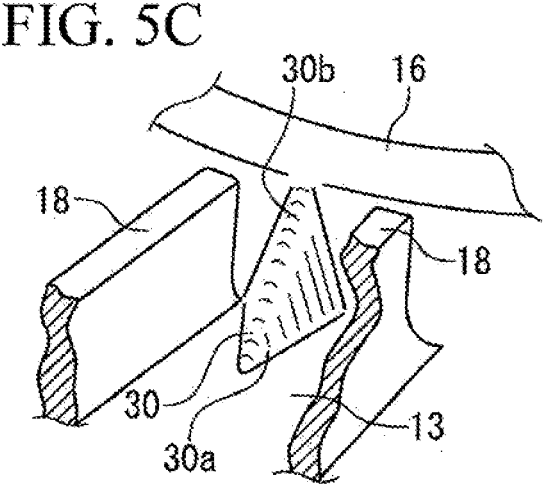
Figure 6A:
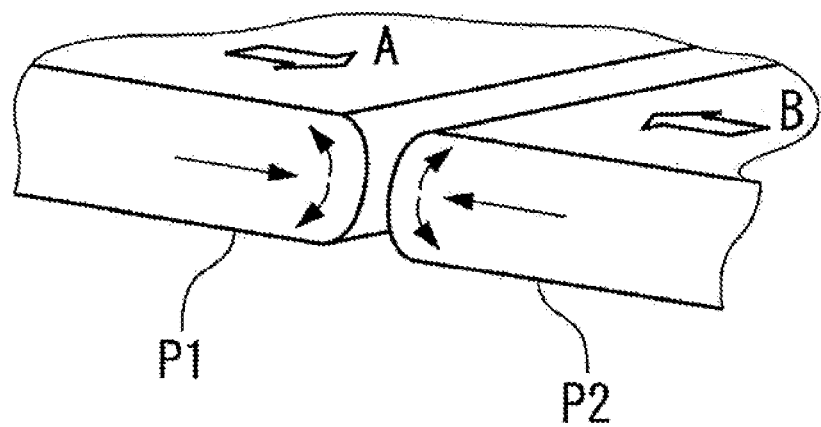
FIGS. 6A and 6B are views showing a resin flow state in a weld part.
Figure 6B:
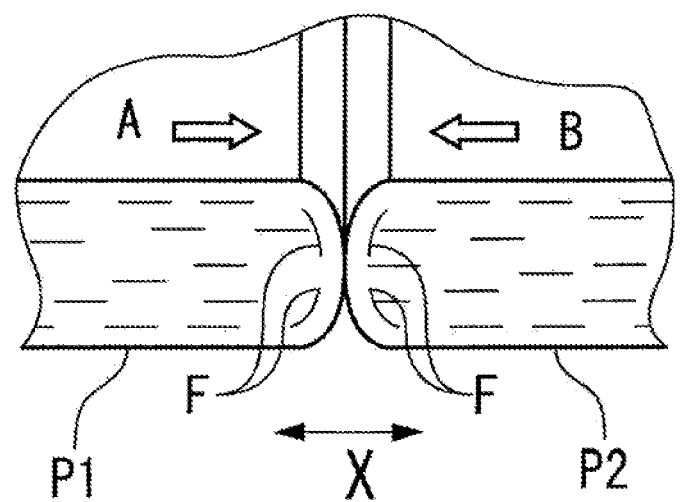

In the above-described embodiment, the shape of the convex part 30 has been illustrated. However, the shape of the convex part 30 is not limited to the illustrated shape. For example, as shown in FIG. 5A, the convex part 30 can take a cross-sectional shape of quadratic curve not having a fixed curvature radius. Also, as shown in FIGS. 5B and 5C, the projecting dimension Z of the convex part 30 projecting from the cylindrical rib 16 may be decreased gradually from the base part 30a on the disc part 13 side toward the tip end part 30b. Thereby, the resin flow in the convex part 30 is further complicated, and thereby the above-described effect can be made more profound.

Also, the convex parts 30 can be formed so as to project to the inner peripheral surface 16b side, not to the outer peripheral surface 16a side, of the cylindrical rib 16. Also, the convex parts 30 can be formed so as to project to both of the outer peripheral surface 16a side and the inner peripheral surface 16b side.

Besides, the configurations described in the above-described embodiment can be selected or can be changed appropriately to other configurations without departing from the spirit and scope of the present invention.

The invention claimed is:

1. A resin fan made of a resin containing glass fiber and comprising a plurality of blades and a boss part to which the blades are attached integrally and which is connected to a motor, wherein
 the boss part comprises:
 a plurality of radial ribs extending radially; and
 a tubular-shaped tubular rib to which one end of each of the radial ribs is connected integrally, and
 the tubular rib comprises a resin agitating part for complicating the orientations of the glass fiber contained in the resin, said resin agitating part formed in a middle portion between a portion in which the radial ribs adjoining each other are connected to the tubular-shaped tubular rib,
 wherein when the resin having glass fiber passes through one radial rib forming portion and the resin having passed through other radial rib forming portion join together in the resin agitating part, the orientations of the glass fiber contained in the resin are complicated.

2. The resin fan according to claim 1, wherein the resin agitating part is a convex part projecting to the outer periphery side and/or the inner periphery side of the tubular rib.

3. The resin fan according to claim 2, wherein the convex part is formed so that the projecting dimension thereof is decreased gradually from one surface side of the fan toward other surface side thereof.

4. The resin fan according to claim 1, wherein the tubular rib is formed so that the thickness in the radial direction thereof is decreased gradually with a gradient of 3 degrees or larger from one surface side of the fan toward other surface side thereof.

5. The resin fan according to claim 1, wherein the tubular rib projects to other surface side of the fan beyond the radial ribs.

6. A resin fan made of a resin containing glass fiber and comprising a plurality of blades and a boss part to which the blades are attached integrally and which is connected to a motor, wherein
 the boss part comprises:
 a plurality of radial ribs extending radially; and
 a tubular-shaped tubular rib to which one end of each of the radial ribs is connected integrally, and
 the tubular rib comprises a resin agitating part for complicating the orientations of the glass fiber contained in the resin having passed through one radial rib forming portion and the glass fiber contained in the resin having passed through the other radial rib forming portion which adjoins the one radial rib forming portion; the resin agitating part is located at a junction portion where the resin having passed through the one radial rib forming portion and the resin having passed through the other radial rib forming portion join together when the resin having been injected into a mold for forming the fan passes through the one radial rib forming portion and the other radial rib forming portion and flows into a tubular rib forming portion in the molding process of the fan,
 wherein the tubular rib is formed so that the thickness in the radial direction thereof is decreased gradually with a gradient of 3 degrees or larger from one surface side of the fan toward the other surface side thereof.

* * * * *